United States Patent
Nakaya et al.

(10) Patent No.: US 7,461,577 B2
(45) Date of Patent: Dec. 9, 2008

(54) BAR MATERIAL SUPPLY DEVICE OF NUMERICALLY CONTROLLED AUTOMATIC LATHE

(75) Inventors: Takaichi Nakaya, Kitasaku-gun (JP); Takashi Kawakubo, Kitasaku-gun (JP); Tadahiro Iida, Tokorozawa (JP); Youhei Nonaka, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 442 days.

(21) Appl. No.: 10/579,747

(22) PCT Filed: Nov. 22, 2004

(86) PCT No.: PCT/JP2004/017345

§ 371 (c)(1),
(2), (4) Date: May 18, 2006

(87) PCT Pub. No.: WO2005/051581

PCT Pub. Date: Jun. 9, 2005

(65) Prior Publication Data

US 2007/0151429 A1 Jul. 5, 2007

(30) Foreign Application Priority Data

Nov. 28, 2003 (JP) .............. 2003-399123
Jul. 23, 2004 (JP) .............. 2004-215299

(51) Int. Cl.
*B23B 17/00* (2006.01)
*B23Q 5/02* (2006.01)

(52) U.S. Cl. .......................... 82/124; 82/127

(58) Field of Classification Search ............ 82/117, 82/124–127; 414/14, 17

See application file for complete search history.

(56) References Cited

U.S. PATENT DOCUMENTS 4,088,230 A * 5/1978 Doe et al. .............. 414/15

(Continued)

FOREIGN PATENT DOCUMENTS

JP H06-8002 1/1994

(Continued)

*Primary Examiner*—Willmon Fridie
(74) *Attorney, Agent, or Firm*—Manabu Kanesaka

(57) ABSTRACT

There is provided a bar material supply device of a simple configuration suited to machining of a bar material without increasing machining cost even when a short bar material such as an end material is machined. The bar material supply device includes a stocker 12 for supplying a bar material w on an axis C of a spindle 230, a base 10 attached to a head stock 220, a push rod 15 disposed in the base 10 to move back and forth on the axis C and to push the bar material w fed from the stocker 12, a push rod guide 11 disposed in the base 10 to guide the back-and-forth movement of the push rod 15, a plurality of rollers arranged on both sides of the axis C of the base 10 to hold the push rod 15 on the axis C therebetween, one of the plurality of rollers being constituted as a driving roller 135 which is rotated by a driving body disposed in the base, and at least one of the other rollers excluding the driving roller 135 being constituted as a driven roller 132 which is rotated without any slippage with the push rod 15, and rotation detection means 133 for detecting the rotation of the driven roller 132.

10 Claims, 12 Drawing Sheets

U.S. PATENT DOCUMENTS

| | | | |
|---|---|---|---|
| 4,406,190 A * | 9/1983 | Mason | 82/127 |
| 4,417,489 A * | 11/1983 | Liu | 82/1.11 |
| 4,417,491 A * | 11/1983 | Uehara et al. | 82/126 |
| 4,628,779 A * | 12/1986 | Louis | 82/126 |
| 4,914,993 A * | 4/1990 | Fabbri | 82/127 |
| 5,170,358 A * | 12/1992 | Delio | 700/177 |
| 5,303,621 A | 4/1994 | Horlitz et al. | |
| 5,957,016 A * | 9/1999 | Segalman et al. | 82/1.11 |
| 6,099,226 A * | 8/2000 | Ito et al. | 414/14 |
| 6,189,426 B1 * | 2/2001 | Segalman et al. | 82/117 |
| 6,871,389 B2 * | 3/2005 | Cheng | 29/38 D |
| 7,302,877 B2 * | 12/2007 | Cucchi | 82/124 |

FOREIGN PATENT DOCUMENTS

| | | |
|---|---|---|
| JP | 07-060503 | 3/1995 |
| JP | 09-094703 | 4/1997 |
| JP | 2001-246502 | 9/2001 |
| JP | 2002-187001 | 7/2002 |

* cited by examiner

BAR MATERIAL SUPPLY DEVICE OF NUMERICALLY CONTROLLED AUTOMATIC LATHE

TECHNICAL FIELD

The present invention relates to a bar material supply device for machining a bar material while sending it through a through-hole of a spindle of a numerically controlled automatic lathe.

BACKGROUND ART

In a numerically controlled machine tool such as a numerically controlled automatic lathe, a long bar material may be used as a material when a relatively small product is machined. As a machining method of this type based on the numerically controlled automatic lathe, there has conventionally been known an art of feeding a bar material to a portion to be machined from a rear side of the numerically controlled automatic lathe by a bar material supply device, and rotating the bar material together with a spindle to cut and machine a front end of the bar material into a predetermined shape (e.g., see Patent Reference 1).

Patent Reference 1: JP A 2001-246502 (refer to FIG. 1 of the drawings, and a paragraph [0008] of the description).

FIG. 14 is an explanatory plan view of an entire configuration of the bar supply device according to the conventional example.

The numerically controlled automatic lathe equipped with the bar material supply device shown in FIG. 14 includes a spindle 230 which is freely back and forth movable in the same direction as that of an axis C of the spindle and a guide bush 232 arranged before the spindle 230, and machines a bar material W by a working tool in a supported state of a front end of the bar material projected from the spindle 230 on the guide bush 232.

As shown in FIG. 14, the bar material supply device 33 includes a push rod 350 constituted separately of the numerically controlled automatic lathe and arranged after (left of a paper surface of FIG. 14) the same to push the long bar material W, and driving means 360 for moving this push rod 350 back and forth. The driving means 360 includes a drive body 361 such as a stepping motor or a servo motor capable of precisely. adjusting a rotational angle position, a driving pulley 362 which is rotated by the drive body 361, a driven pulley 363 arranged in a position opposed to the driving pulley 362, and an endless cableway 364 such as a belt or a change wound between the driving pulley 362 and the driven pulley 363, and the push rod 350 is connected to the endless cableway 364. In a state where a rear end of the bar material W is gripped to rotate by a finger chuck 351 of a front end (right end of the paper surface of FIG. 14), the drive body 361 is driven to move the push rod 350 back and froth on the spindle axis while the endless cableway 364 travels, thereby feeding the bar material W to the spindle 230.

However, the aforementioned bar material supply device has a problem that a mechanism of moving the bar material back and forth is complex, large, and high in cost.

In the aforementioned numerically controlled automatic lathe equipped with the guide bush 232, a short material that cannot be machined any more and must accordingly be discarded as an end material because of a positional relation between the guide bush 232 and a chuck 231 of the spindle 230, a length or a cut-off width of a component to be machined, or the like is left.

FIG. 15 shows a state of the bar material W at-an end of machining when the bar material is machined by the numerically controlled automatic lathe equipped with the guide bush. A short material (hereinafter, such short bar material will be referred as "bar material w" to be differentiated from long "bar material W") that has become an end material is left between the guide bush 232 and the chuck 231 of the spindle 230.

A length of the bar material w is a sum of a distance from a front end of the bar material w in which a product P has been cut off by a cutting-off tool T3 to the chuck 231, a gripping length of the bar material w by the chuck 231, a distance from the chuck 231 to the front end of the push rod 350, and a gripping length of the push rod 350 by the finger chuck 351.

Thus, in the numerically controlled automatic lathe equipped with the guide bush 232, the bar material w of a length 1 impossible to be machined is left even while the product P can be produced more, creating a problem of a reduction in material yield.

Additionally, machining of such a bar material w can be carried out by another numerically controlled automatic lathe having no guide bush. However, when the aforementioned conventional bar material supply device complex in configuration is used, a new problem of a n increase in machining cost of the bar material w is created.

Accordingly, to simplify and miniaturize the aforementioned bar material supply device, there has been proposed a n art of eliminating the endless cableway such as the chain or the belt from the bar material supply device, holding the bar material between two rollers arranged to face each other, and moving the bar material back and forth by rotating the rollers (e.g., see Patent References 2, 3).

Patent Reference 2: JP A 7-60503 (refer to FIG. 2 of the drawings and a paragraph [0010] of the description).

Patent Reference 3: JP A 2002-187001 (refer to FIG. 2 of the drawings and a paragraph [0015] of the description).

According to the art of the Patent Reference 2, as can be understood from FIG. 2, the bar material is held between two carrier rollers 4, 4 arranged to face each other, and the bar material to be machined is fed by rotating the carrier rollers 4, 4.

According to the art of the Patent Reference 3, as can be understood from FIG. 3, the bar material is fed by two carrier rollers 8a, 8b for holding the same therebetween. According to the art described in the Patent Reference 3, the carrier rollers 8a, 8b are both connected to a driving motor 43, and driving force is transmitted from the driving motor 43 to the carrier rollers 8a, 8b. When the bar material is machined, as shown in FIG. 6, the carrier rollers 8a, 8b are retreated to positions for not interfering with the bar material.

DISCLOSURE OF THE INVENTION

However, the technologies of the foregoing Patent References 2, 3 are both for directly feeding the bar material to be machined by the carrier rollers, and not suited for feeding a short material which has become an end material in cutting and machining, or a bar material whose sectional shape is other than a circle, e.g., a bar material having a polygonal sectional shape such as a triangle, a square, or a hexagon, to the spindle. Particularly, in the case of the art of the Patent Reference 3, the endless cableway such as a chain or a belt is made unnecessary to enable miniaturization of the entire bar material supply device. However, a mechanism for distributing driving forces in good balance to the carrier rollers 8a, 8b, and a mechanism for retreating both of the carrier rollers 8a, 8b from the bar material when the machining of the bar material is started, become necessary, resulting in a drawback of a complex structure.

The present invention has been developed to solve all the problems of the conventional technologies, and it is an object of the invention to provide a bar material supply device simple in configuration, especially a bar material supply device capable of reducing a size and cost of a numerically controlled automatic lathe for machining a bar material having a polygonal sectional shape or a short bar material such as an end material.

To solve the aforementioned problems, according to the present invention, a bar material supply device arranged after a numerically controlled automatic lathe to feed a bar material through a through-hole of a spindle rotatably supported on a headstock of the numerically controlled automatic lathe, and to machine the bar material projected from a front end of the spindle by a tool mounted on a tool post includes a stocker for supplying the bar material on an axis of the spindle, a push rod disposed after the stocker to move back and forth on the axis of the spindle, a push rod guide for guiding the back-and-forth movement of the push rod, a plurality of rollers arranged on both sides of the axis to hold the push rod on the axis therebetween, one of the plurality of rollers being constituted as a driving roller which is rotated by a driving body, and at least one of the other rollers excluding the driving roller being constituted as a driven roller which is rotated without any slippage with the push rod, and rotation detection means for detecting the rotation of the driven roller.

With this configuration, the push rod moves back and forth in the state of being held between the two rollers. The bar material is pushed by this push rod to advance. According to the present invention, as only one of the plurality of rollers needs to be a driven roller which is rotated by the driving body, driving means for moving the push rod back and forth can be simplified and miniaturized. Hence, it is possible to reduce the size and weight of the bar material supply device.

According to the present invention, by integrally fitting the bar material supply device to a fixed or moving headstock of the numerically controlled automatic lathe, it is possible to make compact the numerically controlled automatic lathe for machining the bar material and to achieve low cost. For example, the push rod, the push rod guide, the plurality of rollers, and the driving body may be disposed in a base integrally attached to the headstock.

According to the present invention, the stocker may be disposed separately from the numerically controlled automatic lathe, or integrally with the numerically controlled lathe. For example, when the stocker includes a storage unit for storing the material and a supply mechanism for supplying the material on the axis of the spindle from the storage unit, at least one of the storage unit and the supply mechanism may be disposed in the base. In other words, both of the storage unit and the supply mechanism may be attached to the base, or the storage unit may be separated from the supply mechanism to be attached alone to the base.

According to the present invention, slipping means may be disposed to generate slippage between the driving body and the push rod when the back-and-forth movement of the push rod is regulated.

In this case, it is advised that the driving roller is rotatably disposed with respect to a rotary shaft of the driving body, and the slipping means includes a rotor which is rotated integrally with the rotary shaft, and pressing means for relatively pressing the rotor and the driving roller by predetermined pressing force.

With this configuration, when the back-and-forth movement of the push rod is regulated by abutment of the bar material on the stopper or the like, the driven roller detects stoppage of the push rod, and slippage is generated between the driving roller and a drive shaft of the motor. Thus, load detection means for detecting application of a fixed or greater load on the motor is made unnecessary to enable further simplification of the configuration of the bar material supply device.

Detection means may be disposed before the stocker to detect a front end of the bar material.

With this configuration, by obtaining a rotational angle of the driven roller after the detection means detects the front end of the bar material, it is possible to always monitor a front end position of the bar material.

Retreatment regulation means may be disposed to regulate the movement of the push rod when the other end of the push rod retreats to a predetermined retreating position.

With this configuration, it is possible to always monitor the front end position of the push rod based on a relation between a length of the push rod and a last retreating position of the push rod when the movement is regulated by the retreatment regulation means.

By combining the retreatment regulation means with the detection means disposed before the stocker, it is possible to obtain a length of the bar material.

Further, according to the present invention, advancing regulation means may be disposed to regulate the movement of the push rod when one end of the push rod advances to a predetermined advancing position.

With this configuration, even if a length of the bar material is unknown, by determining impossibility of further machining the bar material when one end of the push rod comes to a predetermined advancing position, next bar material can be prepared.

The bar material supply device of the present invention is suited to supplying of a short bar material shorter than a length of the spindle. For example, it is suited to machining of a short bar material such as an end material impossible to be machined by another numerically controlled automatic lathe. Further, the bar material supply device of the present invention can be applied to machining of bar materials having not only circular shapes but also polygonal sectional shapes such as a triangle, a square or a hexagon as the bar material to be machined is not directly fed by a carrier roller.

According to the present invention, the bar material supply device may include, on the axis of the spindle, a standby unit for causing the bar material sent from the stocker to temporarily wait in a contact state with the push rod, and bar material holding means having a positioning unit for positioning the bar material on the spindle axis.

With this configuration, the bar material can be sent from the stocker on the spindle axis in the middle of retreatment of the push rod, and a bar material to be machined next can wait in a position near the spindle axis. Hence, bar material feeding time can be shortened to shorten machining time.

According to the present invention thus configured, the configuration of the bar material supply device can be greatly simplified, miniaturized, and reduced in weight. Hence, the bar material supply device can be integrally attached to the headstock, whereby the numerically controlled automatic lathe equipped with the bar material supply device can be made compact and reduced in cost. Furthermore, the bar material supply device of the present invention is suited to machining of a short bar material such as an end material or a bar material having a polygonal sectional shape.

DESCRIPTION OF REFERENCE NUMERALS

Figure 1:
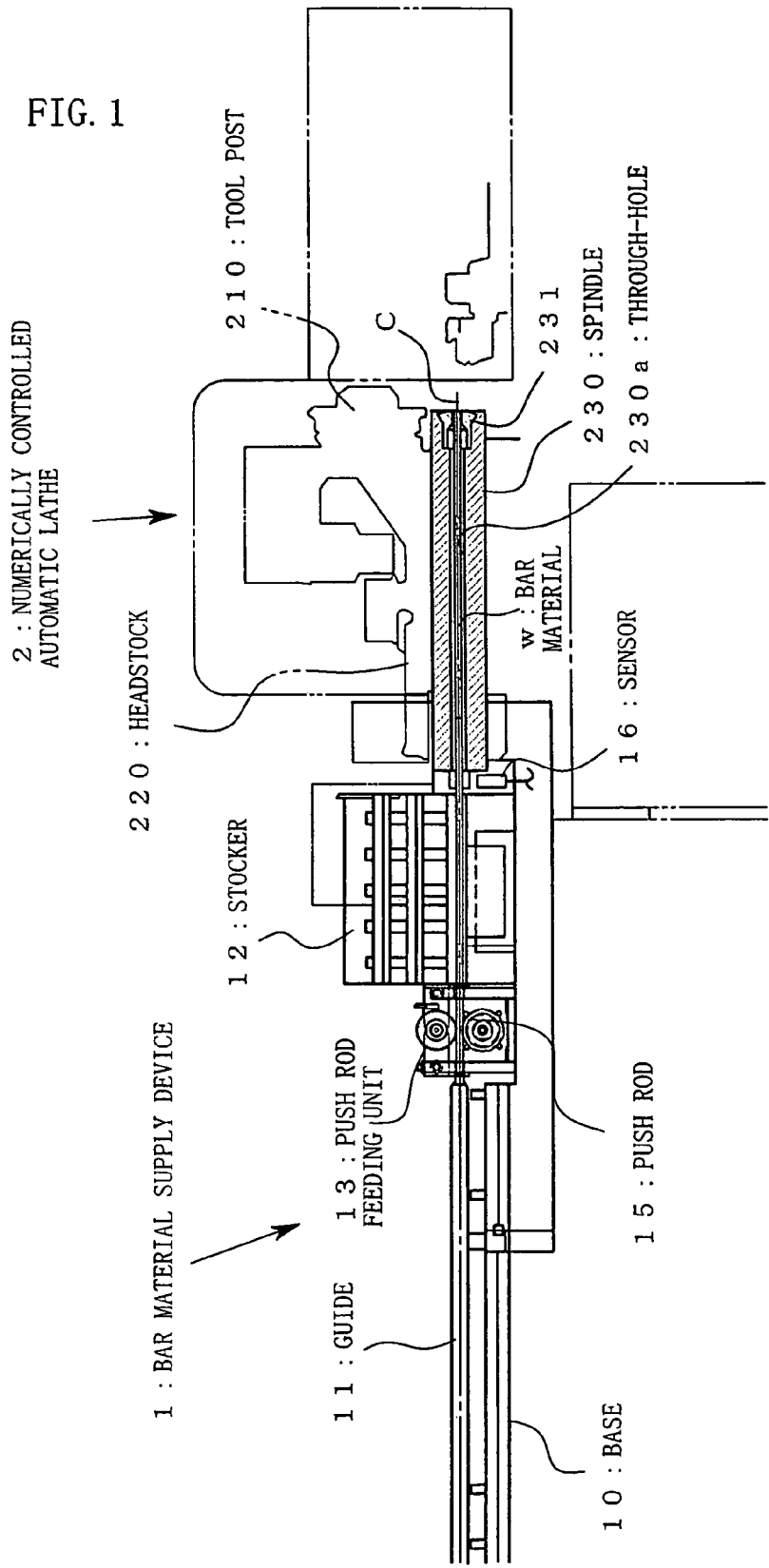
FIG. 1 is an explanatory front view of an entire configuration of a bar material supply device according to an embodiment of the present invention.

1: Bar material supply device
10: Base
11: Guide
111: Guide body
112: Stopper (retreatment regulation means)
113: Detection switch
114: Detection switch (advancement regulation means)
12: Stocker
13: Push rod feeding unit
15: Push rod
16: Sensor
17: Bar material receiver
2: Numerically controlled automatic lathe
210: Tool post
220: Headstock
230: Spindle
231: Chuck
w: Bar material (end material)
w': Left material
W: Bar material

BEST MODE FOR CARRYING OUT THE INVENTION

Hereinafter, a preferred embodiment of the present invention will be described in detail with reference to the drawings.

FIG. 1 is an explanatory front view of an entire configuration of a bar material supply device according to a first embodiment of the present invention.

In the description below, "Front" means a front end side of a spindle having a chuck disposed to grip a bar material, i.e., a right side of FIG. 1, and "Rear" means a left side of FIG. 1. In the description below, a numerically controlled automatic lathe is presumed to be an automatic lathe of a spindle moving type which has a headstock freely movable in the same direction (Z axis direction) of an axis C of the spindle.

[Outline of Numerically Controlled Automatic Lathe]

A spindle 230 having a through-hole 230a in the same direction as the spindle axis C is supported on a headstock 220 of a numerically controlled automatic lathe 2 to freely rotate. A bar material 1 is inserted into the through-hole 230a from a rear end of the spindle 230, and guided through the through-hole 230a to a front end of the spindle 230. A chuck 231 is disposed in the front end of the spindle 230 to grip the bar material w, and the bar material w is gripped by this chuck 231 to rotate integrally with the spindle 230. A tool post 210 equipped with a plurality of tools and capable of setting a predetermined tool in a machining position of the bar material w is disposed above the front end side of the spindle 230, and the bar material w is machined by the tool attached to the tool post 210.

[Entire Configuration of Bar Material Supply Device]

A bar material supply device 1 includes a base 10 disposed after the headstock 220 to be operated from the same, a push rod 15 disposed on the base 10 to push the bar material w from the rear side to insert it through the through-hole 230a, a push rod feeding unit 13 for moving the push rod 15 back and forth on the spindle axis C, a stocker 12 equipped with a storage unit disposed between the push rod feeding unit 13 and the headstock 220 to store a plurality of bar materials w, and a supply mechanism for supplying the bar materials w one by one to the spindle axis C, and a cylindrical guide 11 disposed after the push rod feeding unit 13 to guide the back-and-forth movement of the push rod 15.

A diameter of the push rod 15 is preferably equal to or slightly smaller than an outer diameter of the bar material w. According to the embodiment, in the stocker 12, both of the storage unit for storing the bar material w and the supply mechanism for supplying the bar materials w one by one on the spindle axis C are disposed separately from the headstock 220 and the base 10.

[Configuration of Push Rod Feeding Unit]

Figure 2:
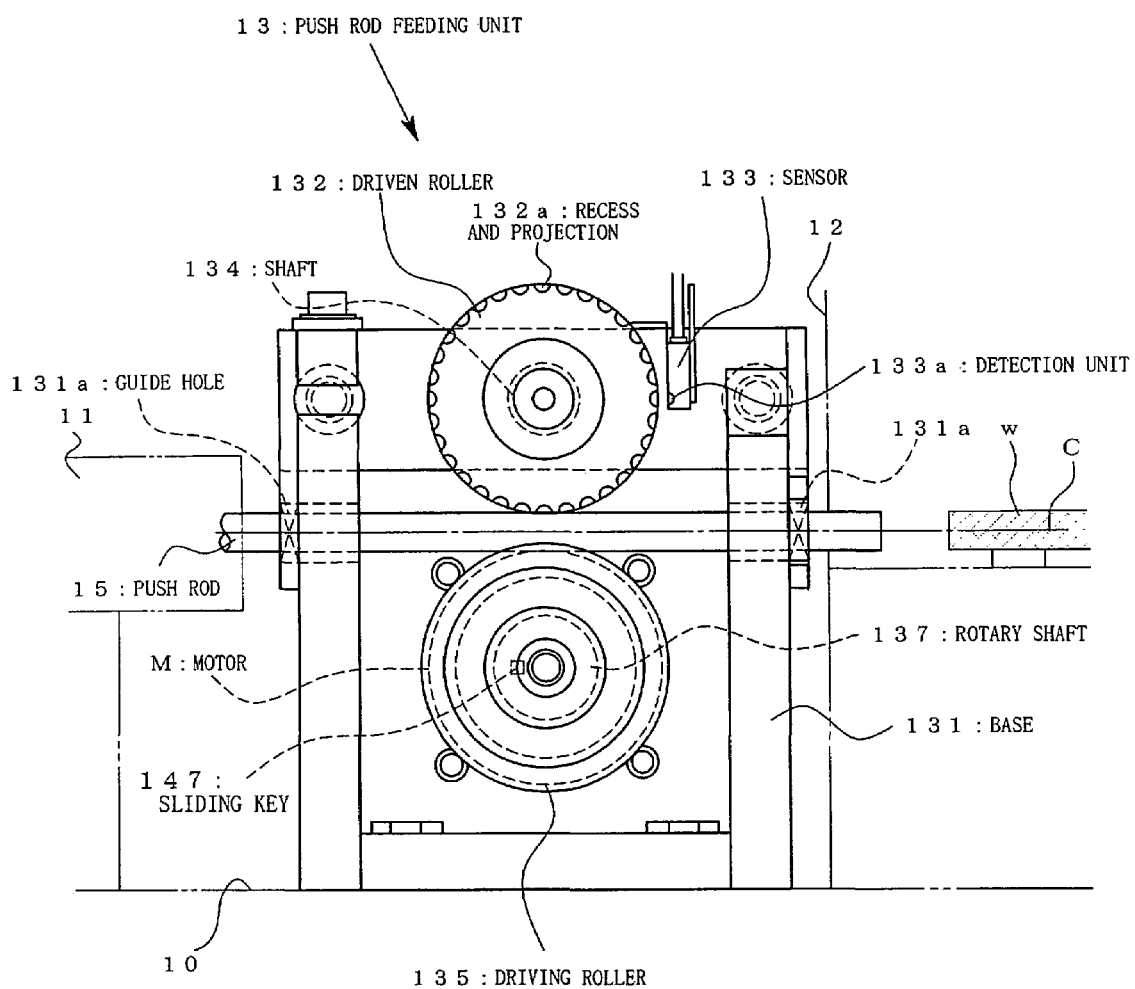
FIG. 2 is an explanatory front view showing a push rod feeding unit for moving a push rod back and forth in detail.
Figure 3:
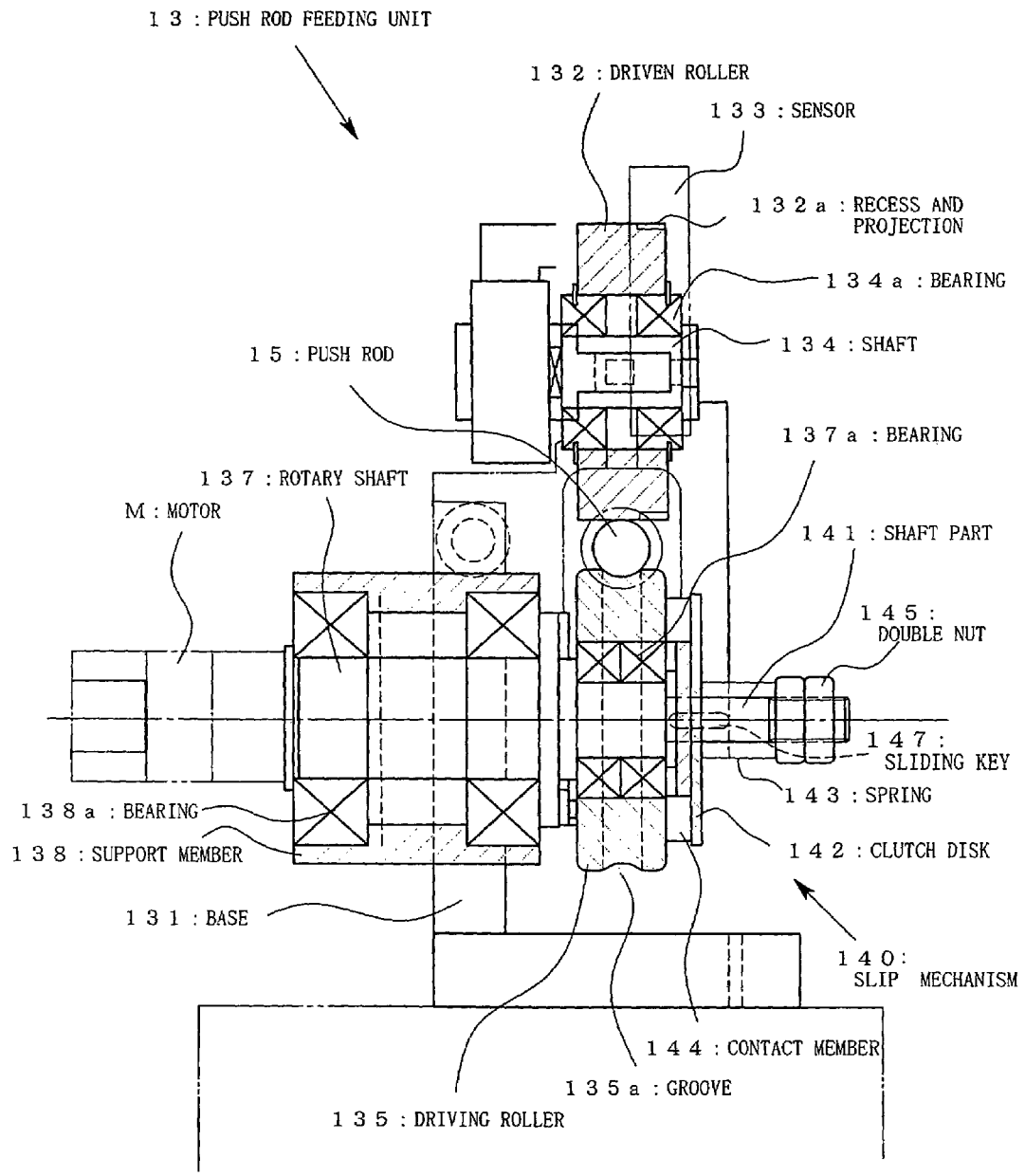
FIG. 3 is a side view of the push rod feeding unit of FIG. 2.

FIG. 2 is a partially expanded front view showing the push rod feeding unit .13 for moving the push rod 15 back and forth on the spindle axis C in detail, and FIG. 3 is a side view of the push rod feeding unit 13 of FIG. 2.

As shown, the push rod feeding unit 13 includes a support body 131 attached on the base 10 of the bar material supply device 1, and two rollers rotatably disposed in the support body 131 to hold the push rod 15 from upper and lower sides, i.e., a lower driving roller 135 and an upper driven roller 132.

Guide holes 131a are formed on both front and rear sides of the support bodies 131 to guide the push rod 15 on the spindle axis C. The driving roller 135 and the driven roller 132 hold the push rod 15 inserted through the guide hole 131a to be poisoned on the spindle axis C from the upper and lower side by almost equal forces.

The driving roller 135 applies propelling force to the push rod 15 to move it back and forth on the spindle axis C, and it is rotatably supported on one end of a rotary shaft 137 attached to a lower side of the support body 131 through a bearing 137a. The rotary shaft 137 is rotatably supported on a support unit 138 disposed in the lower side of the support body 131 through a bearing 138a. A motor M as a driving body is mounted to the support body 131, and a not-shown drive shaft of the motor M is connected to the other end of the rotary shaft 137 on the same axis.

The rotary shaft 137 and the driving roller 135 normally rotate integrally by a slip mechanism 140 disposed on one end side of the rotary shaft 137. The slip mechanism 140 includes a shaft part 141 projected from one end of the rotary shaft 137 to the axis of the same, a double nut 145 engaged with a screw part of a front end of the shaft part 141, and a clutch disk 142 disk-shaped and attached to a base of the shaft part 141.

The clutch disk 142 freely moves back and forth in the same direction as that of an axis of the rotary shaft 137 by a sliding key 147, and is mounted to the shaft part 141 to always rotate integrally with the rotary shaft 137. In a peripheral edge of one surface of the clutch disk 142 facing the driving roller 135, a plurality of contact members 144 are disposed at equal intervals to abut on the driving roller 135.

A spring 143 is attached to the shaft part 141 between the clutch disk 142 and the double nut 145. By this spring 143, the contact members 144 of the clutch disk 142 are always pressed to the driving roller 135 by predetermined pressing force. The pressing force of the spring 143 can be adjusted by changing a fastening position of the double nut 145. By adjusting the pressing force of the spring 142 to be small/large, it is possible to adjust a size of a sliding load applied between the clutch disk 142 and the driving roller 135.

According to the embodiment, in a surface of the driving roller 135, to increase a contact area with the push rod 15, a circular-arc or V-shaped groove 135a having a curvature radius equal to or less than that of the push rod 15 is formed on an entire circumference. Then, friction force applied between the clutch disk 142 and the driving roller 135 is set smaller than that applied between the push rod 15 and the driving roller 135. Thus, when fixed or greater force is applied on the push rod 15 to block rotation of the driving roller 135, e.g., when the front end of the bar material w abuts on the stopper, slippage is generated between the contact member 144 and the driving roller 135 to prevent application of an excessive load on the bar material w.

On the other hand, the driven roller 132 arranged above the driving roller 135 is rotatably supported on the shaft 134 disposed in the upper side of the support body 131 through the bearing 134a. The driven roller 132 reciprocally rotates without any slippage by pressing the push rod 15 to the driving roller 135 accompanying the back-and-forth movement of the push rod 15.

In a surface of the driven roller 132, recesses and projections 132a are formed at equal interfaces in portions not interfering with the push rod 15 on an entire circumference. In the support body 131, a sensor 133 is attached near the driven roller 132.

The recess and protection 132a is directed to a detection unit 133a of the sensor 133, and the recess and projection 132a is detected when the driven roller 132 is rotated. Then, the recess and projection 132a detected by the detection unit 133a is transmitted as a pulse signal to a not-shown controller of the numerically controlled automatic lathe 2 or the bar material supply device 1. The controller obtains a rotational angle of the driven roller 132 and a moving amount of the push rod 15.

When a load is applied to block advancing of the bar material w and the push rod 15 in the middle of feeding the bar material w, the movements of the bar material w and the push rod 15 are stopped. However, the motor M that is a driving body continues driving. As rotation of the driven roller in contact with the push rod 15 without any slippage is stopped, based on a change in the rotation of the driven roller, the controller can determine that a certain load has been applied to stop the advancing of the bar material w and the push rod 15. In other words, according to the embodiment, even without disposing any load detection means or the like in the motor M, contact or the like of the bar material w or the push rod 15 with the stopper or a positioning tool can be detected. As a result, it is possible to simplify a configuration and control of the motor M.

[Guide]

Figure 4:
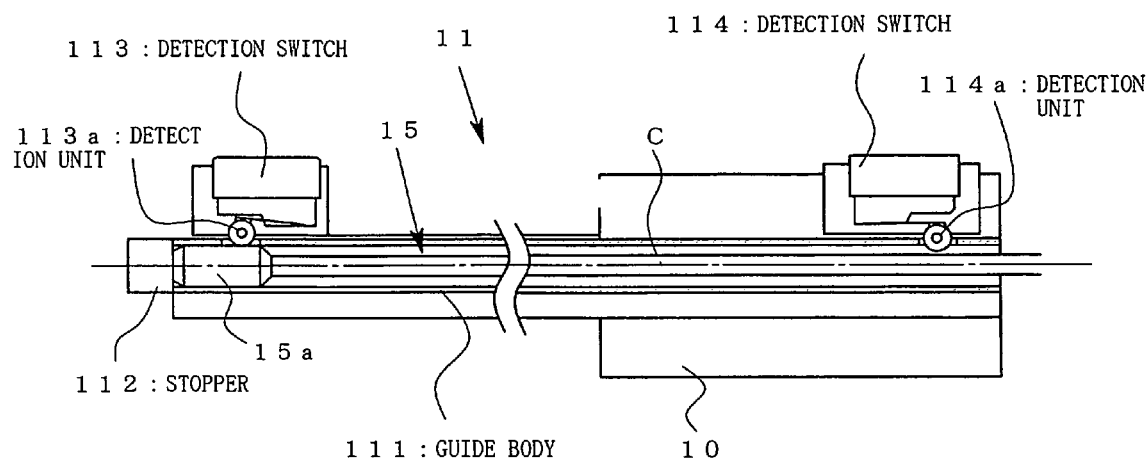
FIG. 4 is an explanatory front view showing a configuration of a guide for guiding the back-and-forth movement of the push rod.

FIG. 4 is an explanatory front view of the guide 11 for guiding the back-and-forth movement of the push rod 15.

The guide 11 for accurately moving the push rod 15 back and forth on the spindle axis C includes a cylindrical guide body 111, detection switches 113, 114 disposed in both front and rear ends of the guide body 111, and a stopper 112 disposed in the rear end of the guide body 111 to regulate retreatment of the push rod 15 by abutment of a rear end of the push rod 15.

A large diameter part 15a slightly larger in diameter than other parts of the push rod 15 is formed in the rear end of the push rod 15. The guide body 111 is formed so that its inner diameter can be almost equal to an outer diameter of the large diameter part 15a. The large diameter part 15a moves back and forth in contact with an inner peripheral surface of the guide body 111, thereby moving the push rod 15 back and forth on the spindle axis C.

The detection switch 114 disposed in the front end of the guide body 111 detects an advancing limit of the push rod 15. The push rod 15 advances, and the large diameter part 15a pushes up the detection unit 114a of the detection switch 114. Accordingly, the controller stops the driving of the motor M to regulate further advancing of the push rod 15.

According to the embodiment, the stopper 12 constitutes retreatment regulation means for regulating a retreating movement of the push rod 15, and the detection switch 114 constitutes advancing regulation means for regulating advancing of the push rod 15 further from a predetermined position.

The detection switch 113 disposed in the rear end of the guide body 111 detects the movement of the push rod 15 to a last retreating position. When the push rod 15 retreats, the large diameter part 15a pushes up a detection unit 113a of the detection switch 113, and the rear end of the push rod 15 abuts on the stopper 112 to stop the rotation of the driven roller 132, the controller determines the movement of the push rod 15 to the last retreating position to stop the driving of the motor M.

According to the embodiment, a sensor 16 is disposed between the headstock 220 and the front end of the base 10 of the bar material supply device 1 to detect the front end of the bar material w. This sensor 16 enables constant monitoring of the front end position of the bar material w by the controller. By obtaining a length of the bar material w, the rear end position of the bar material w, i.e., the front end position of the push rod 15, can be always monitored.

Figure 5:
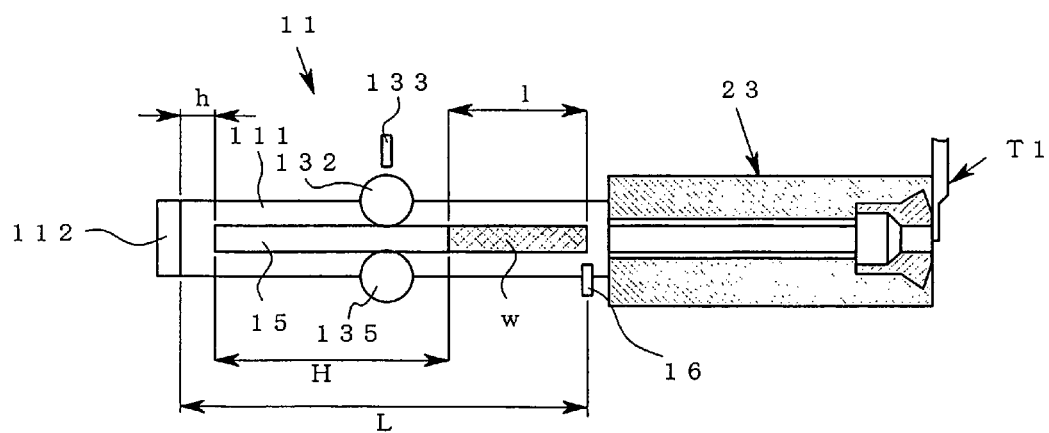
FIG. 5 is an explanatory schematic view showing a principle of obtaining a length of a bar material w in the bar material supply device of the embodiment.

FIG. 5 is an explanatory schematic view of a principle of obtaining the length of the bar material w in the bar material supply device of the embodiment.

As shown in FIG. 5, L indicates a distance from the stopper 112 of the rear end of the guide body 111 to the sensor 16, and H indicates a length of the push rod 15.

When the push rod 15 starts to advance from the last retreating position to abut on the stopper 112, a moving distance of the push rod 15 can be obtained from a rotational angle of the driven roller 132. When the push rod 15 advances by a predetermined distance h, thereby pushing the bar material w, and the sensor 16 detects the front end of the bar material w, a length of the bar material w can be obtained by subtracting the length H and the advancing distance h of the push rod 15 from the distance L.

The sensor 16 detects the front end of the bar material w, whereby the front end position of the bar material can be always monitored based on a rotational angle of the driven roller 132 thereafter. By subtracting a length of a bar material 1 from the front end position of the bar material w, it is possible to always monitor the front end position of the push rod 15.

Figure 6:
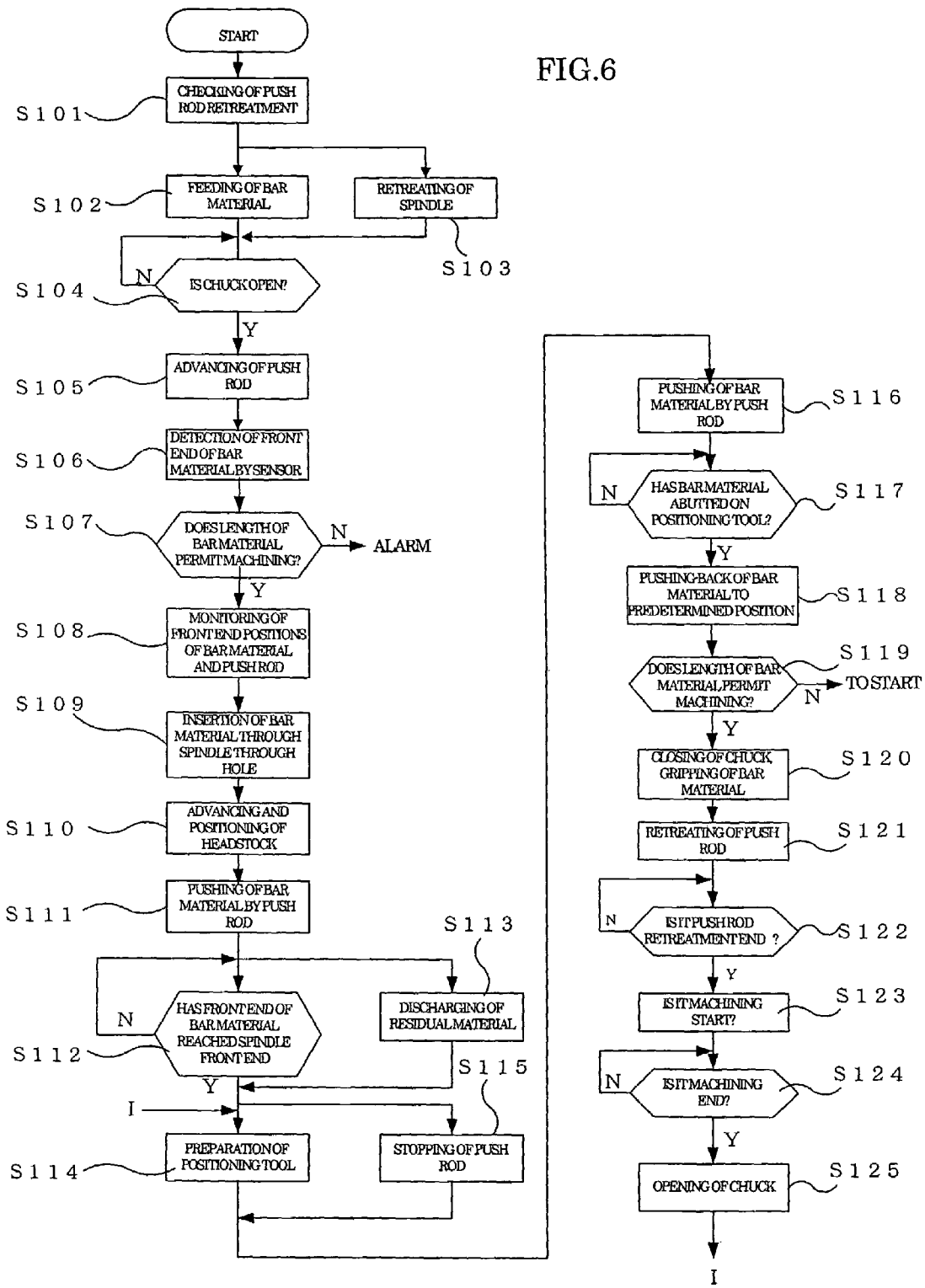
FIG. 6 is an explanatory flowchart showing an operation of the bar material supply device of the embodiment.

Next, the operation of the bar material supply device 1 thus configured will be described by referring to a flowchart of FIG. 6 and operation views of FIGS. 7(a) to 7(e), 8(a) to 8(d).

Figure 7:
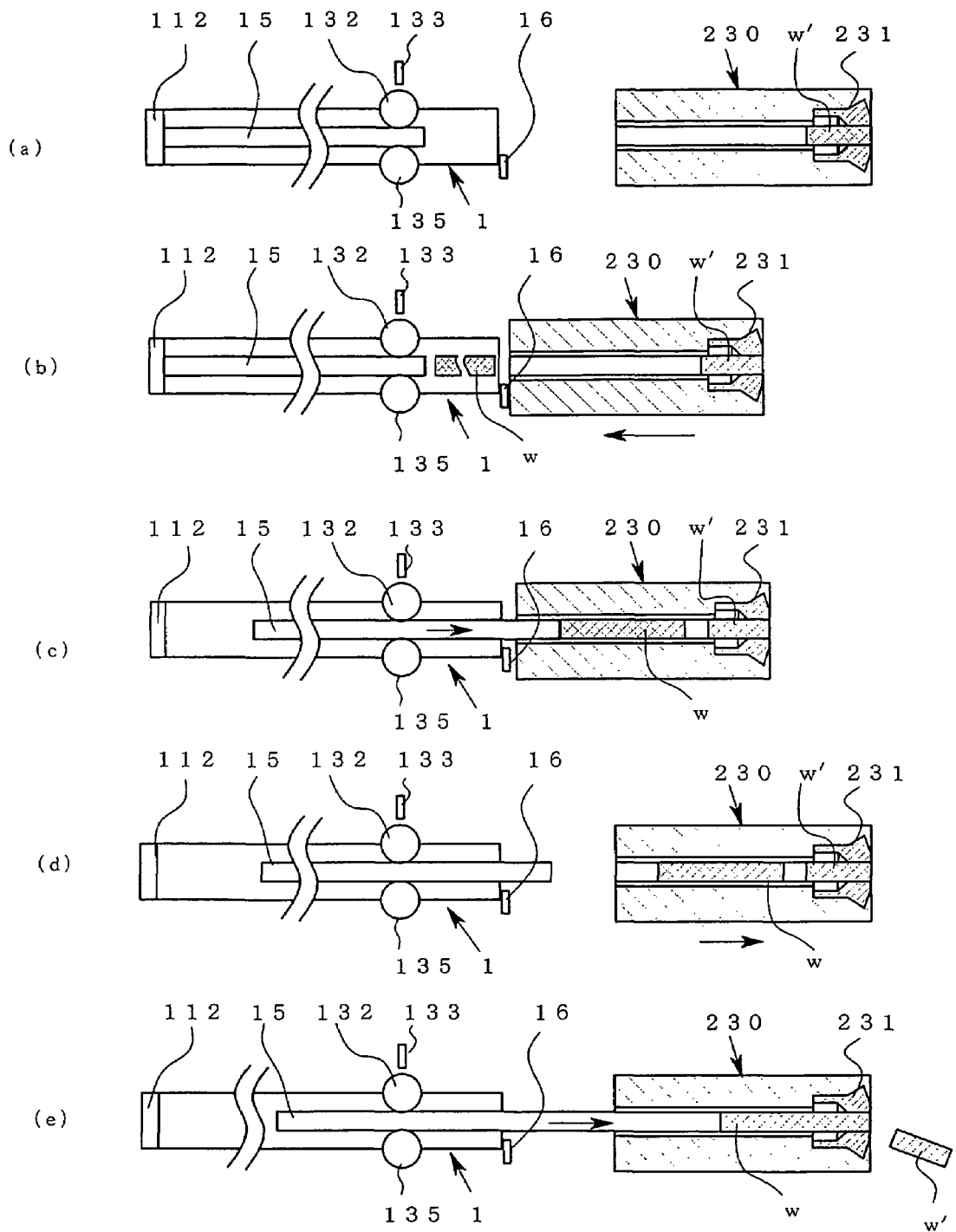
FIGS. 7(a) to 7(e) are explanatory views each showing an operation of the bar material supply device of the embodiment.

Before supplying of the bar material w by the bar material supply device 1, determination is made as to whether the push rod 15 has retreated to the position (last retreating position) to abut on the stopper 12 or not (step S101, FIG. 7(a)). The retreatment of the push rod 15 to the position to abut on the stopper 12 can be checked based on a detection signal by detection of the large diameter part 15a (FIG. 4) by the detection switch 114 and rotation of the driven roller 132 when the motor M is driven in a direction for retreating the push rod 15.

After the checking of the step S101, only one bar material w is fed on the spindle axis C from the stocker 12 (step S102, FIG. 7(b)). The spindle 230 is retreated together with the headstock 220 to the last end position nearest the bar material supply device 1 (step S103, FIG. 7(b)).

Then, under a condition that the chuck 231 of the front end of the spindle 230 is open (step S104), the motor M is driven to advance the push rod 15 (step S105).

When the front end of the push rod 15 abuts on the rear end of the bar material w, the bar material w starts to advance toward the spindle 230.

When the sensor 16 detects the front end of the bar material w (step S106), the controller of the numerically controlled automatic lathe or the bar material supply device obtains a length 1 of the bar material w by calculation through the aforementioned procedure. Determination is made as to whether the length 1 of the bar material w is longer or not than a predetermined length to be machined, i.e., whether the bar material w can be machined or not (step S107). As a result, when the length 1 of the bar material w is determined to be shorter than the length to be machined, the driving of the motor M is stopped to stop the advancing of the push rod 15 and the bar material w, and an alarm or the like is given to announce it to an operator.

When the length 1 of the bar material w is equal to the length to be machined, the advancing of the push rod 15 and the bar material w is continued, and the front end positions of the bar material w and the push rod 15 are monitored (step S108).

The push rod 15 inserts the bar material w into the through-hole 230a up to a position not to abut on a residue (residual material w') of a last machined bar material left in the front end of the spindle 230 (step S109, FIG. 7(c)).

Subsequently, the headstock 220 is advanced to a predetermined position to be positioned (step S110, FIG. 7(d)). After the advancing and the positioning of the headstock 220, the controller drives the motor M again to advance the push rod 15 and the bar material w (step S111).

When the front end of the bar material w reaches the front end of the spindle 230, the residual material w' is pushed by the bar material w to be discharged to the outside of the spindle 230 (step S113, FIG. 7(e)). Under a condition that the front end of the bar material w has reached the front end of the spindle 230 (step S112), the controller stops the driving of the motor M to stop the movement of the push rod 15 (step S115). Further, at this time, a positioning tool T1 is prepared (step S114, FIG. 8(a)).

Figure 8:
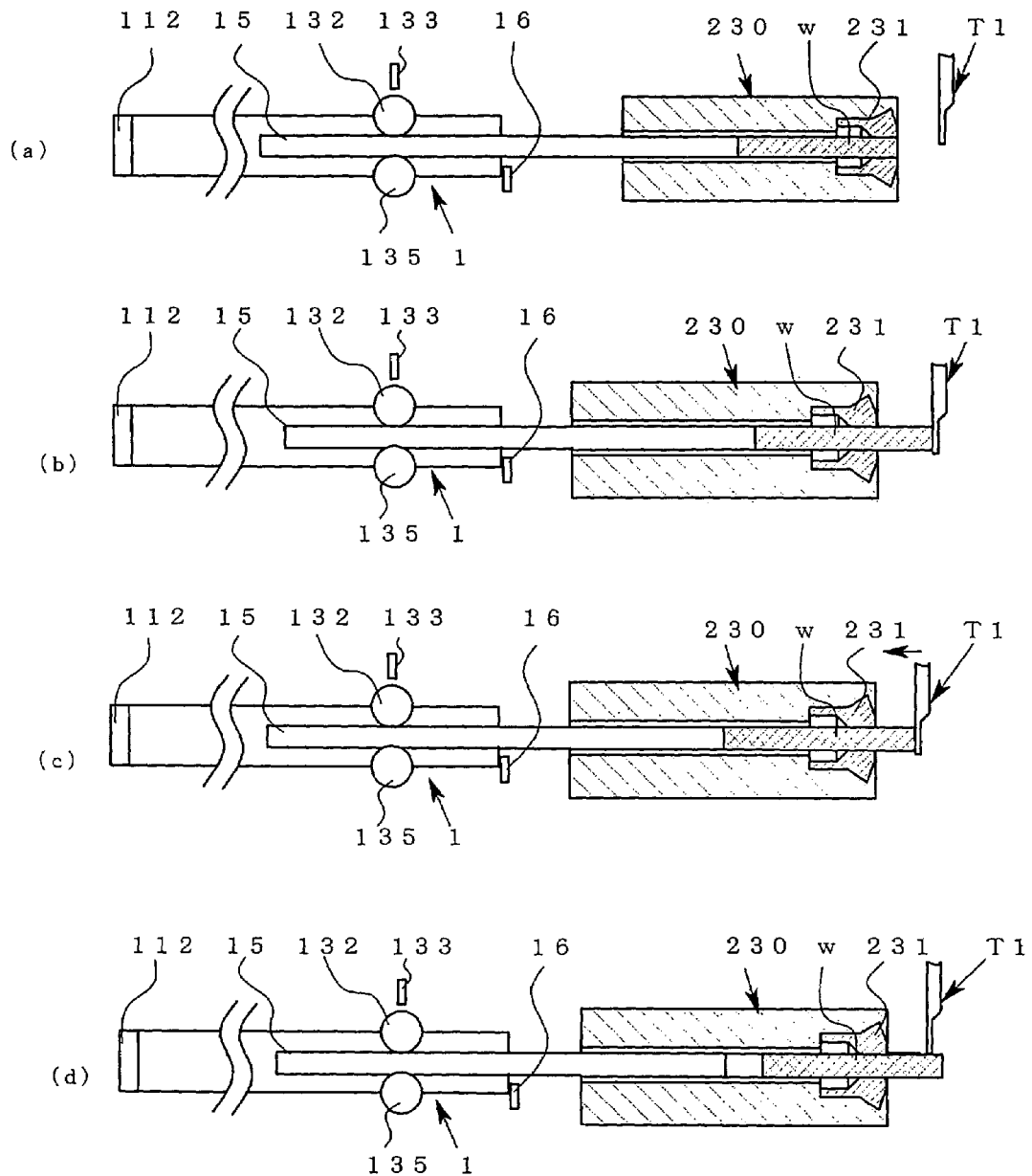
FIGS. 8(a) to 8(d) are explanatory views sequent to FIGS. 7(a) to 7(e), each showing the operation of the bar material supply device of the embodiment.

After checking of the preparation of the positioning tool T1, the controller drives the motor M again to advance the push rod 15, and brings the front end of the bar material w into contact with the positioning tool T1 (steps 116, S117, FIG. 8(b)).

Upon abutment of the front end of the bar material w on the positioning tool T1, the movements of the bar material w and the push rod 15 are regulated to generate slippage between the driving roller 135 and the clutch disk 142 (FIG. 3) of the bar material supply device 1. On the other hand, as rotation of the driven roller 132 is also stropped by the stoppage of the bar material w and the push rod 15, even when the motor M is driven, the controller can determine that the front end of the bar w has abutted on the positioning tool T1. The controller stops the driving of the motor M after this determination.

To improve machining accuracy of the bar material w more, it is advised that after the abutment of the bar material w on the positioning tool T1, the bar material w is slightly pushed back by the positioning tool T1 to set a projecting length of the bar material w from the spindle 230 to a predetermined accurate length (step S118, FIG. 8(c)).

Then, under a condition that the length of the material w permits machining (step S119), the chuck 231 is closed to grip the bar material w (step S120), and the push rod 15 is retreated from the spindle 230 (step S121). According to the embodiment, the push rod 15 is retreated to a last retreating position (step S122).

Subsequently, a machining tool T2 is prepared to replace the positioning tool T1, and machining of the bar material w is started by this machining tool T2 (step S123, FIG. 8(d)).

After an end of the machining by the tool T2 (step S124), a product is cut off by a cutting-off tool, and the chuck 231 is opened (step S125) to return to the step S114. Then, the procedure of the step S116 to the step S125 is repeated. In the step S119 of this process, if the length of the bar material w is shorter than the length to be machined, the process returns to the start to prepare a next bar material w to repeat the processing of the step S101 and after.

The present invention has been described by taking the example of the numerically controlled automatic lathe of the spindle moving type. However, the invention can be applied to a numerically controlled automatic lathe of a spindle fixed type.

Figure 9:
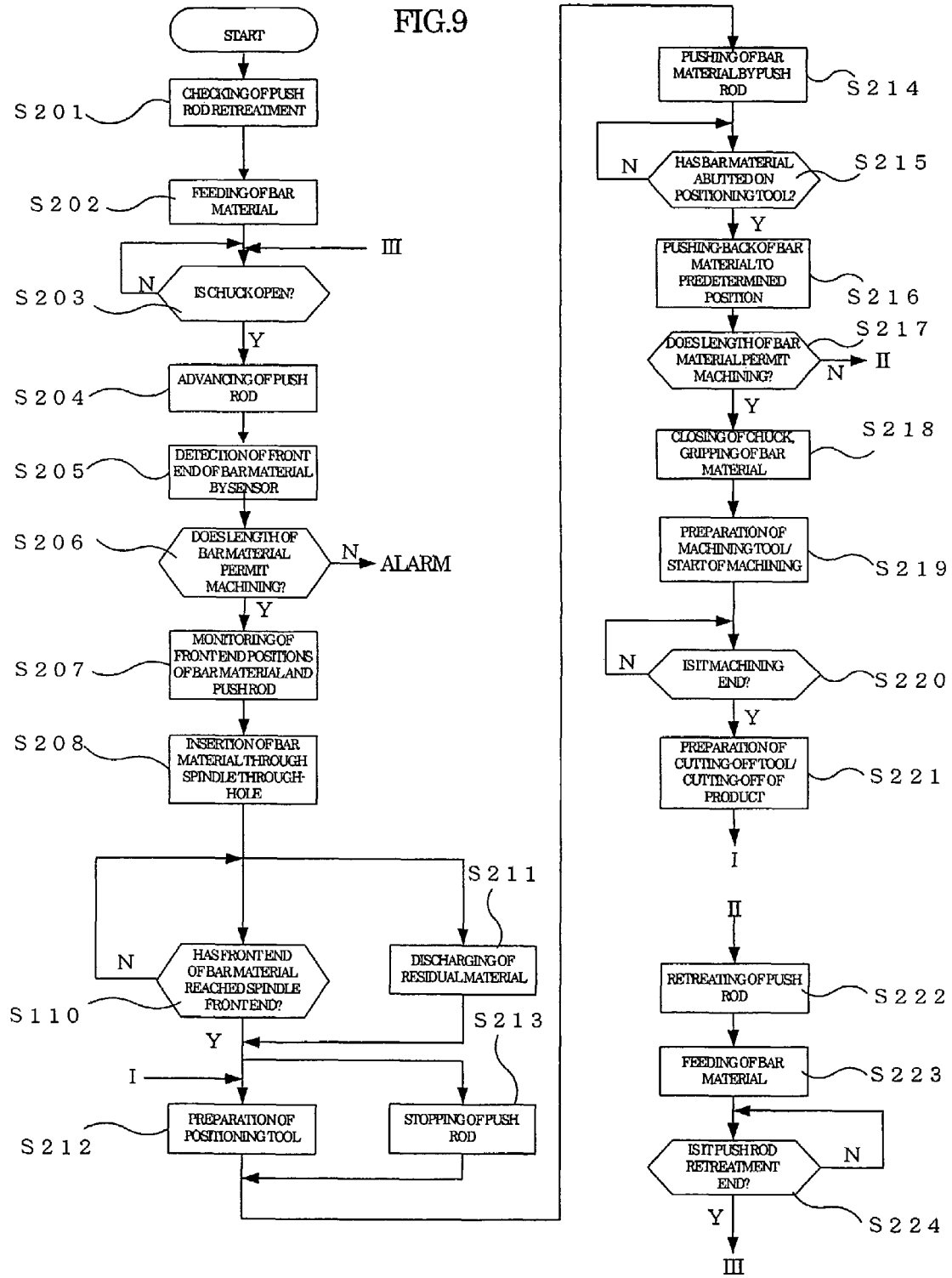
FIG. 9 is an explanatory flowchart showing an operation of a bar material supply device according to a second embodiment of a spindle fixed type.
Figure 10:
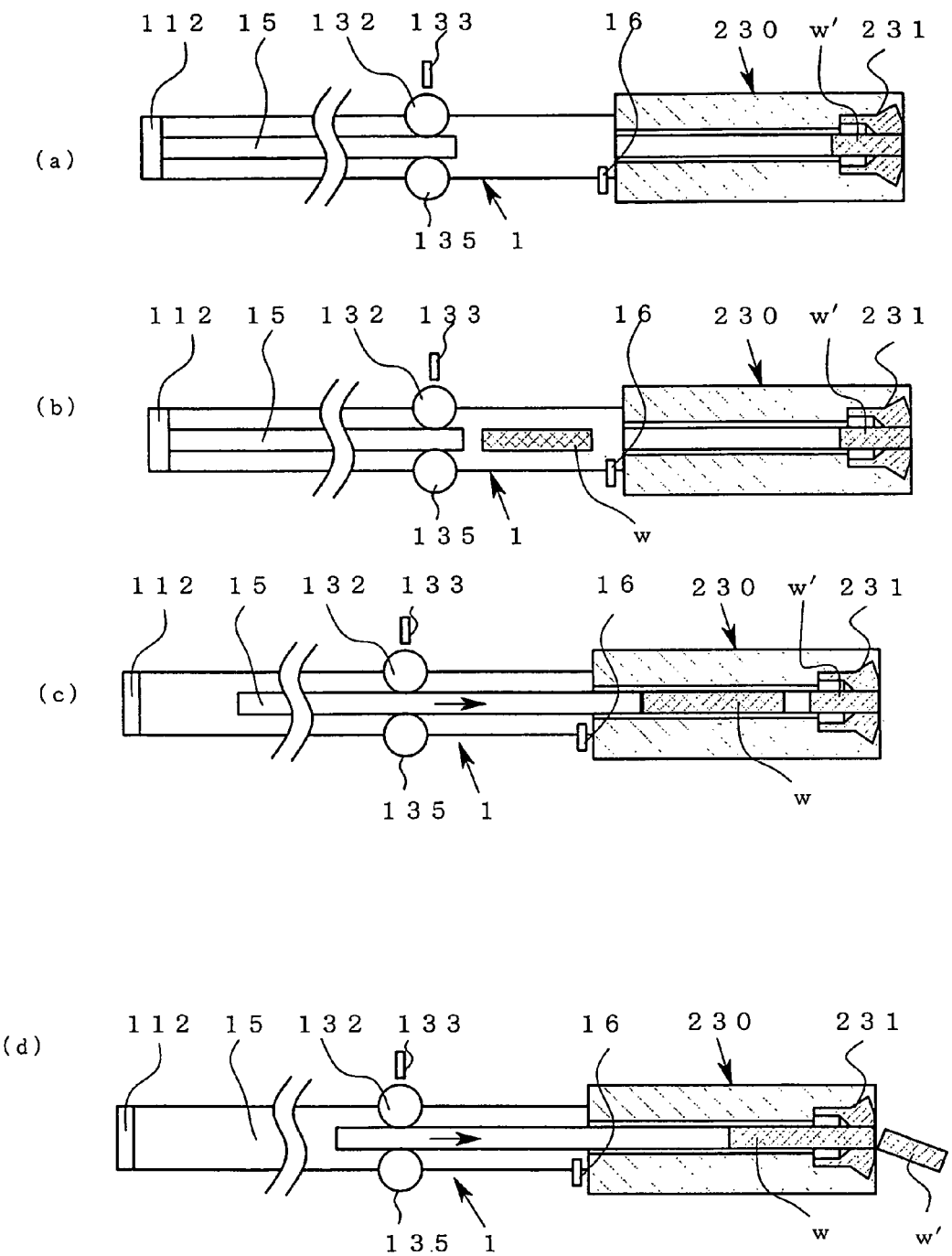
FIGS. 10(a) to 10(d) are explanatory views each showing the operation of the bar material supply device of the embodiment.

Hereinafter, a second embodiment in the case of the spindle fixed type will be described with reference to a flowchart of FIG. 9, and operation views of FIGS. 10(a) to 12(b).

Components of a bar material supply device of the embodiment are similar to those of the first embodiment except for the fact that a headstock 220 is a fixed type and a base 10 is integrally mounted to the headstock 220. Thus, similar reference numerals will be used for similar members and portions, and detailed description of the configuration of the bar material supply device 1 will be omitted.

After turning-ON of power for the bar material supply device 1 and a numerically controlled automatic lathe, before supplying of a bar material w by the bar material supply device 1, determination is made as to whether a push rod 15 has retreated to a position (last retreating position) to abut on a stopper 12 or not (step S201, FIG. 10(a)). The retreatment of the push rod 15 to the position to abut on the stopper 12 can be checked based on a detection signal by detection of a large diameter part 15a (FIG. 4) by a detection switch 114 and rotation of a driven roller 132 when a motor M is driven in a direction for retreating the push rod 15.

After the checking of the step S201, only one bar material w is fed on a spindle axis C from a stocker 12 (step S202, FIG. 10(b)).

Then, under a condition that a chuck 231 of a front end of the spindle 230 is open (step S203), the motor M is driven to advance the push rod 15 (step S204). When a front end of the push rod 15 abuts on a rear end of the bar material w, the bar material w starts to advance toward the spindle 230.

When a sensor 16 detects the front end of the bar material w (step S205), a controller of the numerically controlled automatic lathe or the bar material supply device 1 obtains a length 1 of the bar material w by calculation through the aforementioned procedure.

Determination is made as to whether the length 1 of the bar material w is longer or not than a predetermined length to be machined, i.e., whether the bar material w can be machined or not (step S206). As a result, when the length 1 of the bar material w is determined to be shorter than the length to be machined, the driving of the motor M is stopped to stop the advancing of the push rod 15 and the bar material w, and an alarm or the like is given to announce it to an operator.

When the length 1 of the bar material w is equal to the length to be machined, the advancing of the push rod 15 and the bar material w is continued, and front end positions of the bar material w and the push rod 15 are monitored (step S207).

The bar material w is pushed by the push rod 15 to be inserted into a through-hole 230a of the spindle 230 (step S208, FIG. 10(c)). Then, when the front end of the bar material w reaches the front end of the spindle 230, a residual material w' is pushed by the bar material w to be discharged to the outside of the spindle 230 (step S211, FIG. 10(d)). Under a condition that the front end of the bar material w has reached the front end of the spindle 230 (step S210), the controller stops the driving of the motor M to stop the movement of the push rod 15 (step S213). Further, at this time, a positioning tool T1 is prepared (step S212, FIG. 11(a)).

After checking of the preparation of the positioning tool T1, the controller drives the motor M again to advance the push rod 15, and brings the front end of the bar material w into contact with the positioning tool T1 (steps S214, S215, FIG. 11(b)).

Upon abutment of the front end of the bar material w on the positioning tool T1, the movements of the bar material w and the push rod 15 are regulated to generate slippage between the driving roller 135 and the clutch disk 142 (FIG. 3) of the bar material supply device 1. On the other hand, as rotation of the driven roller 132 is also stropped by the stoppage of the bar material w and the push rod 15, even when the motor M is driven, the controller can determine that the front end of the bar w has abutted on the positioning tool T1. The controller stops the driving of the motor M after this determination.

Figure 11:
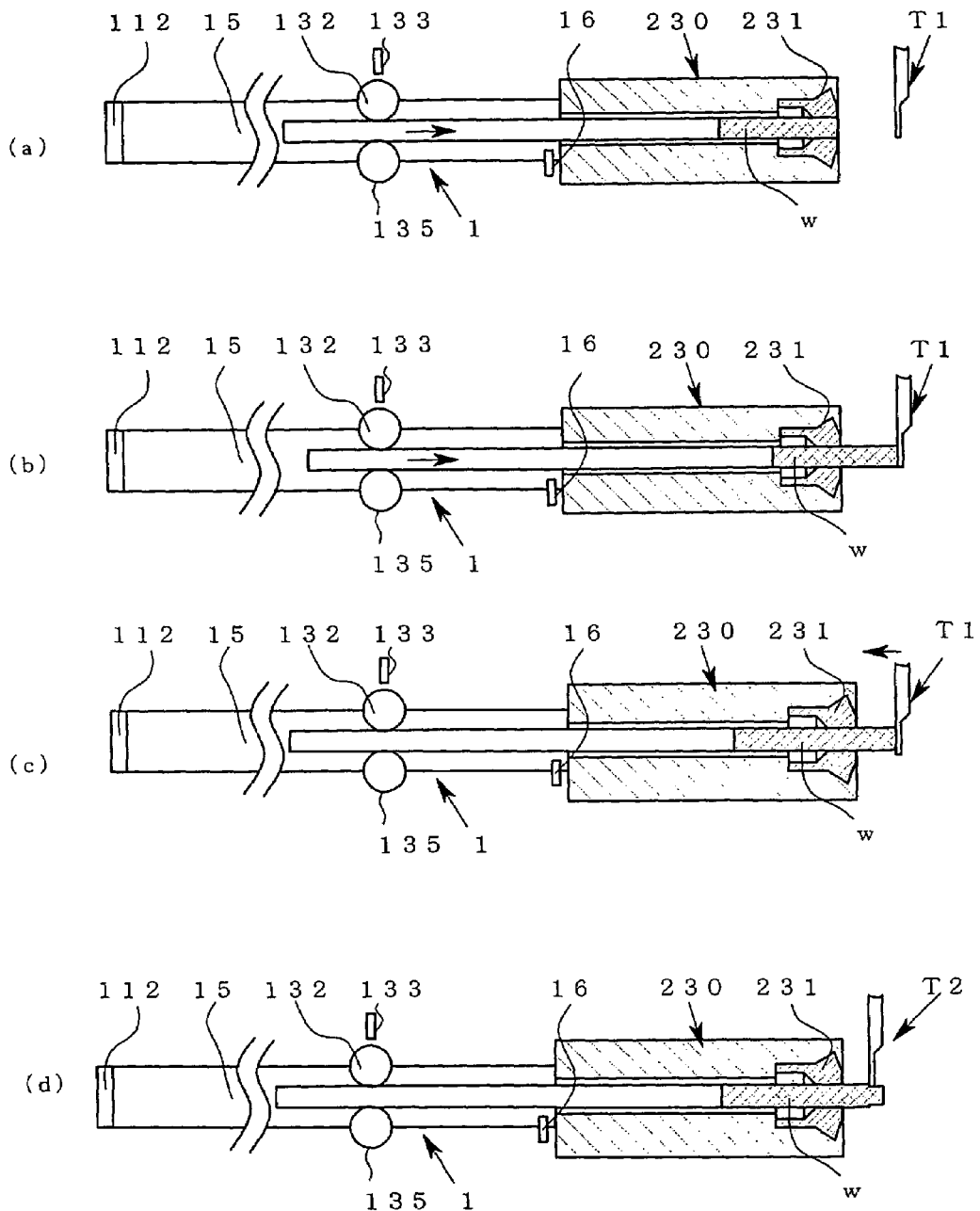
FIGS. 11(a) to 11(d) are explanatory views sequent to FIGS. 7(a) to 7(e), each showing the operation of the bar material supply device of the embodiment.
Figure 12:
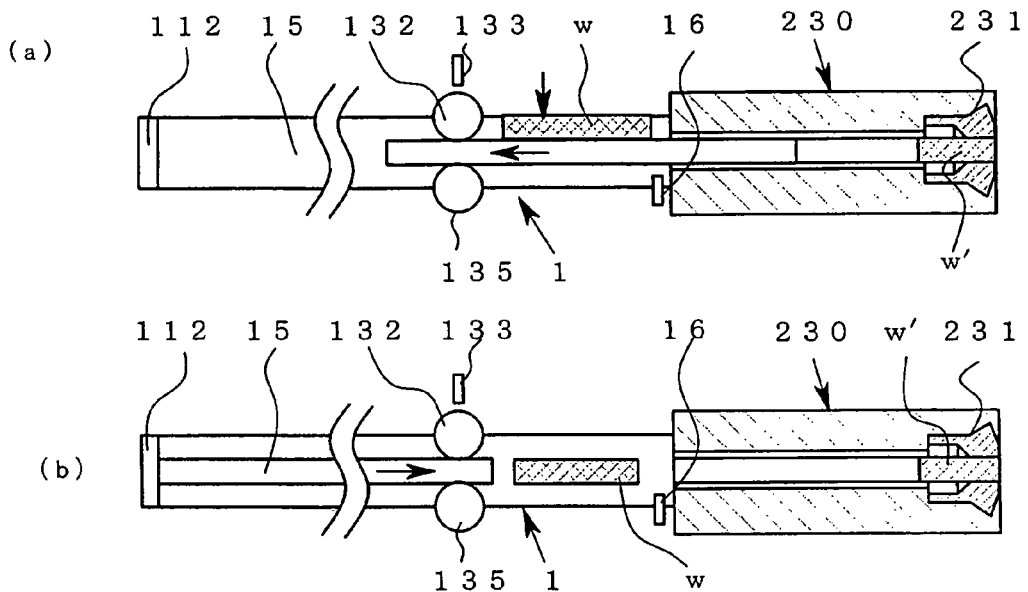
FIGS. 12(a) and 12(b) are explanatory views sequent to FIGS. 11(a) to 11(d), each showing the operation of the bar material supply device of the embodiment.

To improve machining accuracy of the bar material w more, it is advised that after the abutment of the bar material w on the positioning tool T1, the bar material w is slightly pushed back by the positioning tool T1 to set a projecting length of the bar material w from the spindle 230 to a predetermined accurate length (step S216, FIG. 11((c)).

Then, under a condition that the length of the material w permits machining (step S217), the chuck 231 is closed to grip the bar material w (step S218), and a machining tool T2 is prepared to start machining (step S219, FIG. 11(d)).

After an end of the machining (step S220), a cutting-off tool is prepared to cut off a product from the bar material w (step S221). The machining of the bar material w is repeated until the bar material w becomes equal to a length which permits machining (step S212 to step S221).

If the length of the bar material w is determined not to permit machining in the step S217, the push rod 15 is retreated (step S222), and a bar material w to be machined next is sent from the stocker. 12 on the spindle axis C (step S223, FIG. 12(a)).

Figure 13:
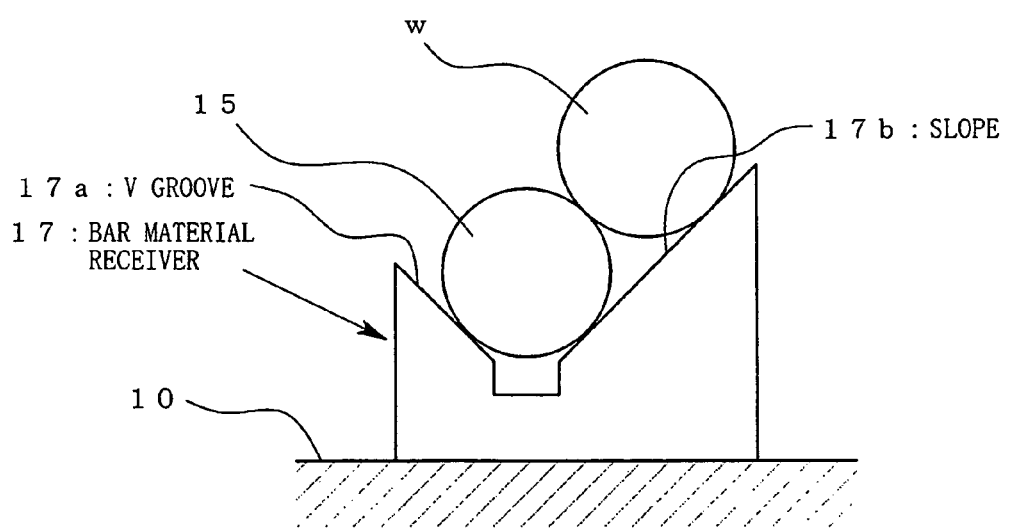
FIG. 13 is a view showing an example of bar material holding means.
Figure 14:
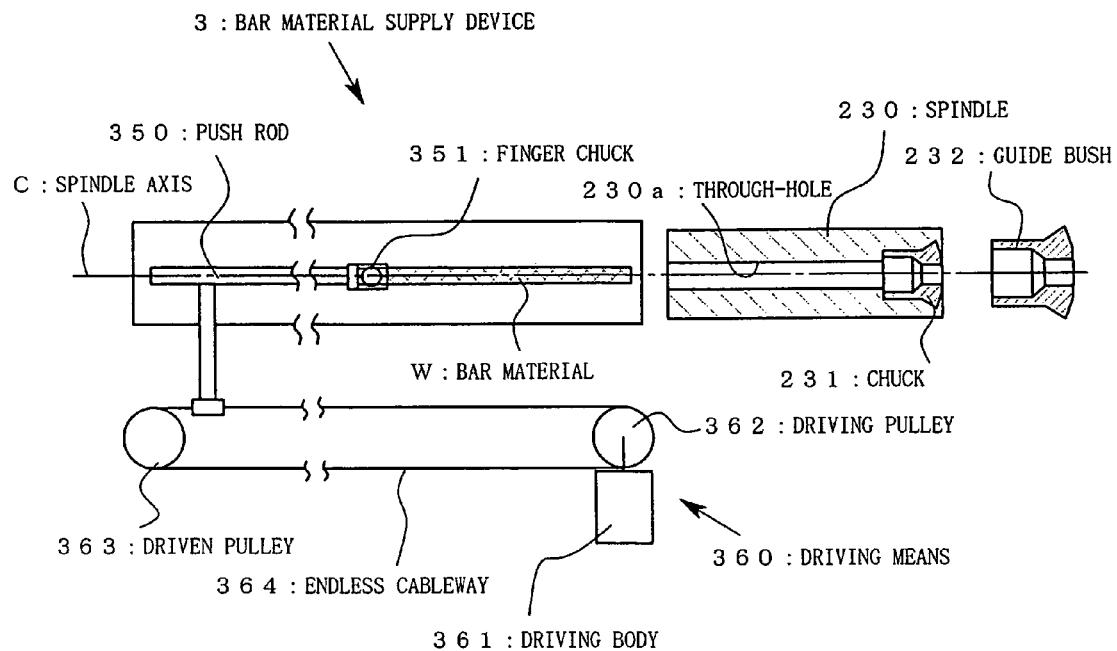
FIG. 14 is an explanatory plan view showing an entire configuration of a bar material supply device according to a conventional example.
Figure 15:
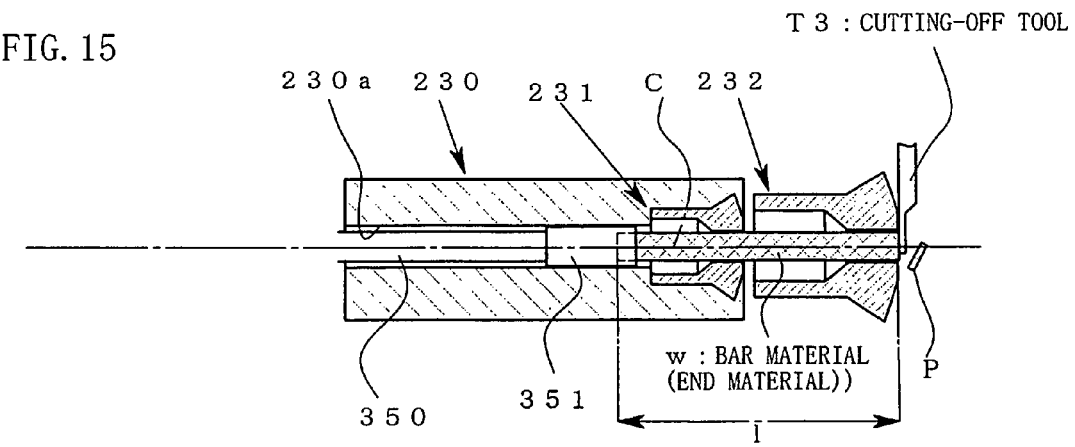
FIG. 15 is a view showing a state of leaving a short bar material as an end material between a guide bush and a chuck of a spindle when a bar material is machined by a numerically controlled automatic lathe equipped with the guide bush.

In this case, for example, it is advised that a bar material 17 is prepared beforehand as bar material holding means having a V-shaped groove (V groove) 17a shown in FIG. 13 on the spindle axis C before the stocker 12, and the bar material w sent from the stocker 12 to be machined next waits on a slope 17a in its abutted state on the retreated push rod 15. According to the embodiment, this standby position constitutes a "standby unit".

When the front end of the push rod 15 reaches a rear end of the bar material w to be machined next, the bar material w that has abutted on the push rod 15 drops into the V groove 17a to be positioned on the spindle axis C.

Thus, simultaneously with the reaching of the push rod 15 to the last retreating position, advancing of the push rod 15 can be started (step S224, FIG. 12(b)), whereby machining time can be shortened.

The preferred embodiments of the present invention have been described. However, the embodiments are in no way limitative of the invention.

For example, for the detection of the rotational angle of the driven roller 132, not only the sensor 133 such as a proximity sensor for detecting the recess and projection 132a but also another rotational detection sensor, an encoder or the like may be used.

Additionally, as long as necessary position accuracy of the push rod 15 is obtained only by detecting the large diameter part 15a of the push rod 15 to stop the motor M by the detection switch 113, the stopper 112 does not need to be installed as retreatment regulation means. In this case, it is possible to use a slip mechanism 140 which generates slippage only in one rotational direction.

Furthermore, in the foregoing, one driving roller 135 and one driven roller 132 are disposed. However, these may be plural.

In the foregoing, the length of the bar material w is obtained to determine the front end position of the push rod 15, the front end position of the push rod 15 is monitored and, when the push rod 15 advances to the predetermined position, a next bar material is prepared by determining that further machining of the bar material w is impossible. However, when the large diameter part. 15a of the push rod 15 is detected by the detection switch 114 as the advancing regulation means, further machining of the bar material w may be determined to be impossible.

Furthermore, the first embodiment has been described by taking the example of the headstock of the moving type, and the second embodiment has been described by taking the example of the headstock of the fixed type. Needless to say, however, it is possible to apply the bar material supply device of the first embodiment to the headstock of the fixed type and the bar material supply device of the second embodiment to the headstock of the moving type.

INDUSTRIAL APPLICABILITY

The description has been made by taking the example of supplying the short bar material such as an end material impossible to be machined by another numerically controlled automatic lathe equipped with the guide bush. However, the bar material supply device of the present invention can be applied to supplying of a short bar material shorter than a total length of the spindle, and a bar material having a polygonal sectional shape such as a triangle, a square, or a hexagon.

The invention claimed is:

1. A bar material supply device of a numerically controlled automatic lathe arranged after the numerically controlled automatic lathe having a headstock and a spindle rotatably supported on the headstock so that a front end of a bar material is inserted through a through-hole of the spindle to project from a front end of the spindle, and the front end of the bar material is machined by a tool mounted on a tool post, the bar material supply device being characterized by comprising:
   a stocker to supply the bar material on an axis of the spindle;
   a push rod disposed after the stocker to move back and forth on the axis of the spindle;
   a push rod guide to guide the back-and-forth movement of the push rod;
   a plurality of rollers arranged on both sides of the axis to hold the push rod on the axis therebetween, one of the plurality of rollers being constituted as a driving roller which is rotated by a driving body, and at least one of the other rollers excluding the driving roller being constituted as a driven roller which is rotated without any slippage with the push rod; and
   rotation detection means for detecting the rotation of the driven roller.

2. The bar material supply device of the numerically controlled automatic lathe according to claim 1, characterized in that:
   a base is attached to the headstock, and
   the base includes the push rod which is freely back and forth movable on the axis, the push rod guide to guide the back-and-forth movement of the push rod, the plurality of rollers to hold the push rod on the axis therebetween, and the driving body which rotates at least one of the plurality of rollers.

3. The bar material supply device of the numerically controller automatic lathe according to claim 2, characterized in that the stocker includes a storage unit to store the material, and a supply mechanism to supply the material on the axis of the spindle from the stocker, and at least one of the storage unit and the supply mechanism is disposed in the base.

4. The bar material supply device of the numerically controlled automatic lathe according to claim 1, characterized by further comprising slipping means for generating slippage between the driving body and the push rod when the back-and-forth movement of the push rod is regulated.

5. The bar material supply device of the numerically controlled automatic lathe according to claim 4, characterized in that the driving roller is rotatably disposed with respect to a rotary shaft of the driving body, and the slipping means includes a rotor which is rotated integrally with the rotary shaft, and pressing means for relatively pressing the rotor and the driving roller by predetermined pressing force.

6. The bar material supply device of the numerically controlled automatic lathe according to claim 1, characterized by further comprising detection means for detecting a front end of the bar material before the stocker.

7. The bar material supply device of the numerically controlled automatic lathe according to claim 1, characterized by further comprising retreatment regulation means for regulating the movement of the push rod when the other end of the push rod retreats to a predetermined retreating position.

8. The bar material supply device of the numerically controlled automatic lathe according to claim 1, characterized by further comprising advancing regulation means for regulating the movement of the push rod when one end of the push rod advances to a predetermined advancing position.

9. The bar material supply device of the numerically controlled automatic lathe according to claim 1, characterized in that the bar material has a sectional shape of an end material or a polygon.

10. The bar material supply device of the numerically controlled automatic lathe according to claim 1, characterized by further comprising, on the axis of the spindle, a standby unit which causes the bar material sent from the stocker to temporarily wait a contact state with the push rod, and bar material holding means having a positioning unit to position the bar material on the spindle axis.

* * * * *